Jan. 20, 1970     T. W. STONE     3,491,260
STRESS ISOLATION IN END FRAME MOUNTING OF DYNAMOELECTRIC MACHINE
Filed Dec. 5, 1967

Inventor
Thomas W. Stone
By Joseph A. Genignani
Attorney

United States Patent Office 3,491,260
Patented Jan. 20, 1970

3,491,260
STRESS ISOLATION IN END FRAME MOUNTING OF DYNAMOELECTRIC MACHINE
Thomas W. Stone, Owosso, Mich., assignor to Controls Company of America, Melrose Park, Ill., a corporation of Delaware
Filed Dec. 5, 1967, Ser. No. 688,191
Int. Cl. H02k 5/16, 5/04
U.S. Cl. 310—91
10 Claims

ABSTRACT OF THE DISCLOSURE

Stresses can result from connection of a fastener to a dynamoelectric machine housing and, where the fastener and bearing are associated on the same housing portion, these stresses can be transmitted to and detrimentally affect the bearing. In accordance with this disclosure, such stresses are isolated from the machine bearing through the use of a slit in the area of the fastener. Structurally, the bearing is located centrally in a housing end portion and the fastener receiving opening, or fastener, is positioned in the housing end portion in spaced relation from the bearing. The slit intersects a line from the bearing through the center of the fastener receiving opening. The slit walls are physically separated but are generally contiguous so that the housing interior is closed to the exterior through the slit.

BACKGROUND OF THE INVENTION

Field of the invention

This invention relates to dynamoelectric machines and, more particularly, to isolation of the machine bearings from stresses created in the machine housing.

Description of prior art

The prior art has recognized the problem of stresses created in the housing of a dynamoelectric machine, e.g. by fasteners connected to the end frame of an electric motor, and has also recognized the effect of those stresses on the machine bearings. Various proposals have been made for isolating the machine bearings from such stresses, an example of one such proposal is found in U.S. Patent 3,238,401 to Joseph E. Baclawski. This patent discusses the problems presented by stresses created in a motor end frame as a result of attachment of fasteners to the end frame and proposes as a solution removal of material from the area of the end frame between the bearing and the fastener. This solution results in a substantially open end frame and is not completely satisfactory as it can only be used in those applications which can tolerate the exposure of the motor interior resulting from the removal of end frame material.

SUMMARY OF THE INVENTION

In accordance with this invention, the housing end portion, which carries the bearing and the fastener receiving area of the dynamoelectric machine, is provided with a slit in the fastener receiving area. The slit intersects a line from the bearing through the fastener receiving area and extends around a portion of the fastener receiving area. The slit is further characterized in that the opposed slit walls are physically separated but are sufficiently close to each other to substantially close the interior of the housing to the exterior through the slit. In this manner, the slit isolates the bearing from stresses initiated at the fastener receiving area and also maintains the housing end portion closed through the medium providing the stress isolation.

DESCRIPTION OF PREFERRED EMBODIMENT

Figure 2:
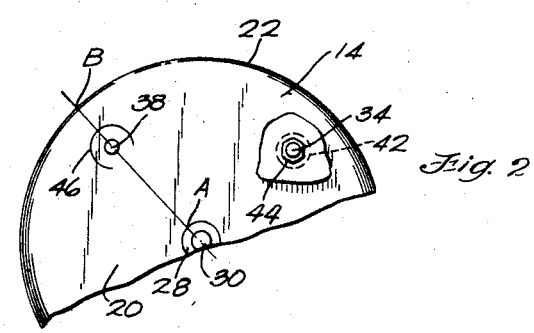
FIGURE 2 is a partial end view of the motor.
Figure 1:
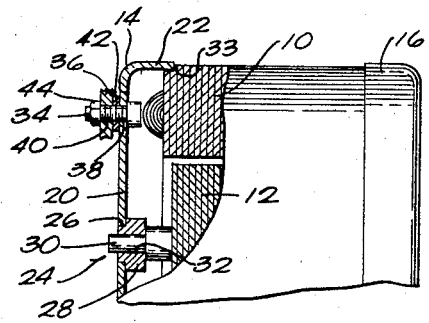
FIGURE 1 is a side elevation with portions broken away to expose the motor interior.

For convenience, this invention will be discussed in connection with an electric motor but it will be appreciated that the invention has application to other types of dynamoelectric machines.

The motor includes the usual stator 10 and armature 12 disposed within the stator. In the illustrated motor, end frames 14 and 16 cooperate with stator 10 to form the outer motor enclosure. It will be appreciated that this is merely illustrative and that other housing arrangements could be utilized, for example end frames 14 and 16 could be connected so that the entire motor housing would be defined by sheet material such as that now illustrated in connection with the end frames.

The end frames are of identical construction and therefore only one will be described in detail. End frame 14 is generally cup-shaped, that configuration being defined by a radial section 20 and section 22 extending axially from the radial section and around its periphery. The radial section is adapted to support a bearing assembly 24. More particularly, the radial section is provided with a central opening 26 and bearing 28 is suitably fixed in that opening. Shaft 30 of armature 12 is received in bore 32 of the bearing and in that manner the armature is supported for rotation with respect to the stator. Again it will be appreciated that the specific bearing construction and connection to armature is merely for illustrative purposes and for that reason has been greatly simplified.

Radial section 20 of the end frame is also provided with fastening means, such as opening 38 for receiving a suitable fastener such as a casebolt or studbolt which can be used either to connect the end frame to the stator assembly or to provide a point of attachment for the motor assembly to a support surface. In the illustrated embodiment, end frame 14 is attached to the stator by a suitable adhesive 33 between the stator and axial section 22. Bolt 34, which is utilized to provide a connection to a suitable mounting surface 36, is illustrated as the fastener. More specifically, bolt 34 passes through an opening 38 in radial end frame section 20 and also through an opening 40 in support wall 36. Spacer 42 is provided to maintain the desired spacing between the motor and the support wall and nut 44 threads onto the bolt to complete the connection.

The end cap is made of a thin sheet metal, stamped and suitably formed to provide the illustrated cup-shape. When bolt 34 is attached to the mounting surface the motor is suspended from the mounting surface. It has been recognized that connection of a fastener to the end frame can create stresses in the end frame, particularly where the motor is suspended as illustrated. When the end frame also carries the bearing, such stresses can be transmitted through the end frame to the bearing where they result in abnormal bearing loading, e.g. distortion, excessive wear (bearing and shaft), overheating, and eventual premature bearing failure. This invention is concerned with the problem of isolating the bearing from such stresses. The solution proposed by this invention achieves stress isolation of the bearing in a manner which utilizes a minimum of end frame area so that its possible positioning on the end frame is not limited, which is relatively simple to incorporate in the end frame, and which is capable of maintaining a closed end frame.

More specifically, it has been discovered that stress isolation can be achieved by providing a slit 46 in the area of the fastener. The slit can be made with a suitable shearing tool such that the confronting walls of the slit are physically separated but are sufficiently close together that the end frame remains virtually closed at the slit. The slit walls, even through physically separated, are sufficiently close together to substantially block the passage of dust, dirt, etc. through the slit and in this sense the confronting slit walls can be considered contigous.

Figure 3:
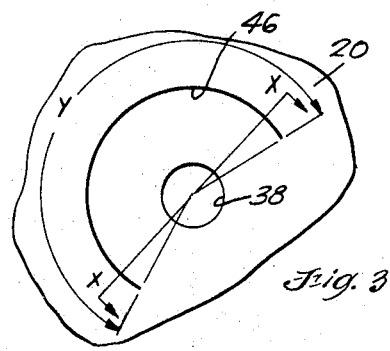
FIGURE 3 is an enlarged view of the fastener area and slit.

The slit 46 is arranged at the fastener opening 38 in such a manner that any stresses created by connection of the fastener, e.g. to the illustrated support panel, are concentrated at the fastener opening and are not transmitted to the bearing. With reference to FIG. 3 slit 46 surrounds a portion of the fastener opening, preferably extending over an angle of at least 180° with respect to the axis of the fastener opening. As illustrated, angle Y of the slit is greater than 180°. With this arrangement all stresses created at the fastener are concentrated in a plane X—X and are not transmitted to the bearing.

With the limited area required by the slit, it can be arranged in any number of positions with respect to the fastener opening. In this connection, it was also recognized that one of the factors resulting in stress transmission to the bearing is the fastener opening being positioned between two fixed points in the end frame which are connected through an otherwise continuous bridge. With reference to FIG. 2, the fastener opening is located between one fixed point A, the bearing attachment, and a second fixed point B, the juncture with axial section 16 which is in turn connected to the stator. It was discovered that the slit could be positioned on either radial side of the fastener opening and effectively isolate stresses. This recognition together with the characteristic that the slit requires only a limited area on the end frame, led to the illustrated preferred arrangement with the slit positioned between the fastener opening and point B.

More specifically, line A–B is a radial line extending from the center of the bearing through the center of the fastener opening. The slit is generally U-shaped, preferably arcuate, and intersects line A–B radially outward from the fastener opening and with respect to the bearing axis. The slit extends on both sides of the radial line and subtends an angle of at least 90° on either side of the line and with respect to center of fastener opening.

This arrangement is relatively simple to provide and it occupies a minimum area in the end plate leaving the central area of the end plate undisturbed and available for other design considerations. The slit provides effective stress isolation but maintains a closed end frame.

Although but one embodiment of the present invention has been illustrated and described, it will be apparent to those skilled in the art that various changes and modifications may be made therein without departing from the spirit of the invention or from the scope of the appended claims.

I claim:

1. In a dynamoelectric machine the combination of
 a rotatable assembly,
 a housing having a relatively thin wall portion and a bearing receiving area thereon,
 bearing means connected to said housing portion at said bearing receiving area and supporting said rotatable assembly,
 means defining at least one fastener receiving area in said housing portion spaced from said bearing means,
 whereby stresses initiating at said fastener receiving area are transmittable to said bearing means through said housing portion,
 and means defining a slit in said housing portion intersecting a line from said bearing means through said fastener receiving area, said slit characterized in that the confronting walls thereof are physically separated but are sufficiently close to each other to substantially close the interior of said housing to the exterior thereof through the slit, said slit isolating said bearing means from stresses initiated at said fastener receiving area.

2. The combination of claim 1 wherein said slit is generally U-shaped and embraces at least a portion of said fastener receiving area.

3. The combination of claim 1 wherein said housing portion comprises an end frame at an axial end of said dynamoelectric machine.

4. The combination of claim 3 wherein
 said bearing means is located generally in the center of said end frame,
 said fastener receiving area comprises an opening spaced radially from said bearing means,
 and said slit intersects a line extending from said bearing means through the center of said fastener receiving area.

5. The combination of claim 4 wherein said slit is generally U-shaped and subtends an angle of at least 90° on both sides of said line and with respect to the center of said fastener receiving opening.

6. The combination of claim 5 wherein said slit is disposed on the radially outward side of said fastener receiving opening.

7. The combination of claim 1 wherein
 said housing portion comprises an end frame at an axial end of said dynamoelectric machine and made of relatively thin sheet material,
 said bearing means is located generally in the center of said end frame,
 said fastener receiving area comprises an opening spaced radially from said bearing means,
 said slit is generally arcuate and located on the radially outward side of said fastener receiving opening embracing at least a portion of said opening,
 and said slit intersects a radial line extending from said bearing means through the center of said fastener receiving opening.

8. The combination of claim 7 wherein said slit subtends an angle of at least 90°, with respect to the center of said fastener receiving opening, on both sides of said line to embrace at least a portion of said fastener receiving opening.

9. The combination of claim 7 wherein said end frame includes
 a generally radially disposed portion,
 an axially extending portion disposed at the edge of said radial portion,
 said bearing means and said fastener receiving opening provided in said radial portion,
 and said slit provided between said fastener receiving opening and said axially extending portion.

10. In a dynamoelectric machine the combination of
 a rotatable assembly,
 a housing having a relatively thin wall portion,
 bearing means connected to said housing portion and supporting said rotatable assembly,
 fastening means on said housing portion spaced from said bearing means,
 whereby stresses initiating at said fastening means are transmittable to said bearing means through said housing portion,
 and means defining a slit in said housing portion at and embracing a portion of said fastening means, said slit characterized in that the confronting walls thereof are physically separated but are sufficiently close to each other to substantially close the interior of said housing to the exterior thereof through the slit, said slit isolating said bearing means from stresses initiated at said fastening means.

References Cited

UNITED STATES PATENTS

| | | | |
|---|---|---|---|
| 3,238,401 | 3/1966 | Baclawski | 310—91 |
| 3,270,222 | 8/1966 | Shaffer | 310—51 |

WARREN E. RAY, Primary Examiner